(12) United States Patent
Sakabe et al.

(10) Patent No.: US 10,319,218 B2
(45) Date of Patent: Jun. 11, 2019

(54) WIRELESS BATTERY SYSTEM, AND WIRELESS SYSTEM

(71) Applicant: HITACHI CHEMICAL COMPANY, LTD., Tokyo (JP)

(72) Inventors: Kei Sakabe, Tokyo (JP); Takanori Yamazoe, Tokyo (JP); Hiroshi Arita, Tokyo (JP)

(73) Assignee: HITACHI CHEMICAL COMPANY, LTD., Tokyo (JP)

( * ) Notice: Subject to any disclaimer, the term of this patent is extended or adjusted under 35 U.S.C. 154(b) by 0 days.

(21) Appl. No.: 15/547,141

(22) PCT Filed: Jan. 22, 2016

(86) PCT No.: PCT/JP2016/051840
§ 371 (c)(1),
(2) Date: Jul. 28, 2017

(87) PCT Pub. No.: WO2016/121644
PCT Pub. Date: Aug. 4, 2016

(65) Prior Publication Data
US 2018/0012484 A1 Jan. 11, 2018

(30) Foreign Application Priority Data
Jan. 30, 2015 (JP) ................................ 2015-016349

(51) Int. Cl.
*G08C 17/02* (2006.01)
*H01M 10/42* (2006.01)
(Continued)

(52) U.S. Cl.
CPC ............. *G08C 17/02* (2013.01); *G08C 17/00* (2013.01); *G08C 25/00* (2013.01);
(Continued)

(58) Field of Classification Search
CPC ...................................................... H04W 72/08
See application file for complete search history.

(56) References Cited

U.S. PATENT DOCUMENTS

2012/0320741 A1* 12/2012 Freda ..................... H04W 16/14
370/229
2013/0217399 A1 8/2013 Xhafa et al.

FOREIGN PATENT DOCUMENTS

JP       2012-222913 A       11/2012
JP       2013-140055 A        7/2013
(Continued)

OTHER PUBLICATIONS

International Search Report, PCT/JP2016/051840, dated Apr. 12, 2016, 2 pgs.

*Primary Examiner* — Nabil H Syed
(74) *Attorney, Agent, or Firm* — Volpe and Koenig, P.C.

(57) ABSTRACT

There is provided a wireless battery system reconcilable with unsuccessful communication due to interference from an external wireless instrument or radio wave reflection or shielding under a surrounding physical environment. A wireless battery system allocates a cell controller to a cell, detects a cell state, and wirelessly communicates a cell state detected by a cell controller to a battery controller. During the wireless communication, the battery controller transmits a beacon to the cell controller and specifies a duration for radio wave environment measurement and a frequency to be measured as a condition. The cell controller performs radio wave environment measurement under the specified condition and then returns a measurement result along with the cell state to the battery controller.

13 Claims, 8 Drawing Sheets

(51) Int. Cl.
*G08C 25/00* (2006.01)
*G08C 17/00* (2006.01)
*H01M 10/48* (2006.01)
*H04W 72/08* (2009.01)

(52) U.S. Cl.
CPC ......... *H01M 10/425* (2013.01); *H01M 10/48* (2013.01); *H04W 72/08* (2013.01); *G08C 2200/00* (2013.01); *G08C 2201/50* (2013.01); *G08C 2201/60* (2013.01); *H01M 2010/4271* (2013.01); *H01M 2010/4278* (2013.01)

(56) References Cited

FOREIGN PATENT DOCUMENTS

| | | |
|---|---|---|
| JP | 2013-183201 A | 9/2013 |
| WO | 2013/126441 A1 | 8/2013 |
| WO | 2014/103008 A1 | 7/2014 |

* cited by examiner

PRIOR ART

WIRELESS BATTERY SYSTEM, AND WIRELESS SYSTEM

TECHNICAL FIELD

The present invention relates to a wireless battery system and a wireless system to perform wireless communication between a plurality of controllers provided in a storage battery module. More specifically, the present invention relates to a wireless battery system and a wireless system that can stably and continuously operate during a failure such as unsuccessful communication in particular.

BACKGROUND ART

There is a need to effectively use natural energies such as wind power and sunlight in order to achieve a low carbon society. However, the natural energies largely vary and produce instable output. To solve this, output equalization is studied by temporarily storing energy generated by the natural energy in an electric storage device.

The electric storage device requires high output and a large capacity and is therefore configured by a storage battery module that includes a plurality of secondary batteries (hereinafter referred to as cells) connected in series parallel. A secondary battery such as a lead battery or a lithium-ion battery needs to be appropriately used so as to prevent high-voltage charging or performance degradation due to over discharge. The storage battery module therefore must include a function that measures battery states such as voltage, current, and temperature.

Figure 2:
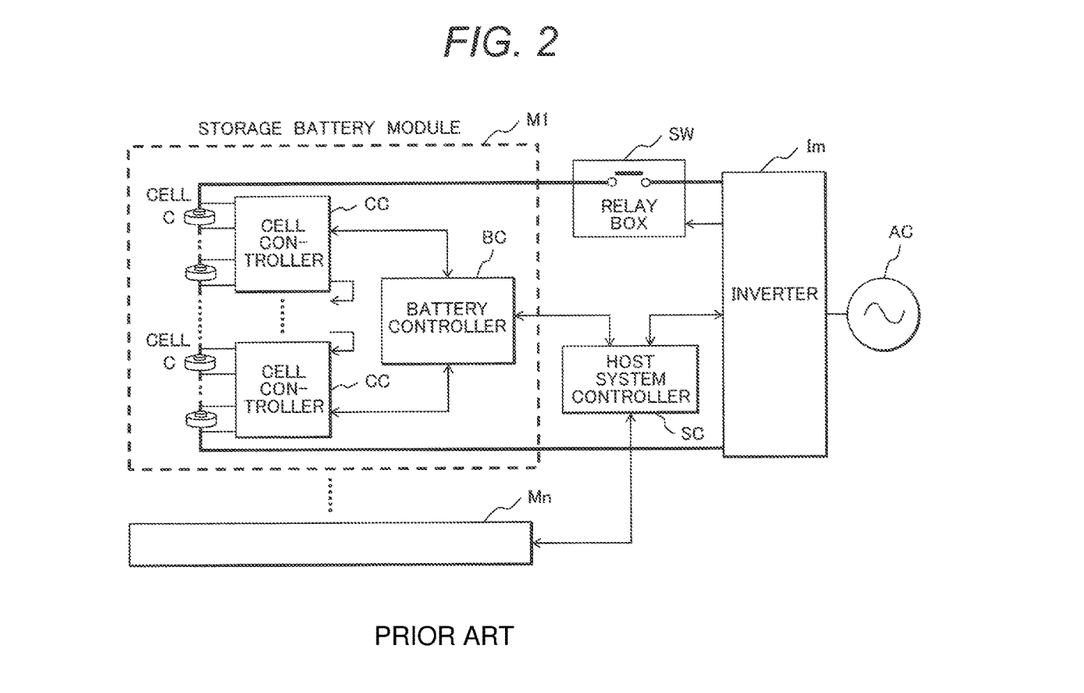
FIG. 2 is a drawing illustrating a basic configuration of an ordinary storage battery module.

FIG. 2 illustrates a configuration example of ordinary storage battery module M. As illustrated in FIG. 2, storage battery module M includes a plurality of cells C connected serially or in series parallel. Both ends thereof are connected to inverter In via relay box Sw to supply electric power to alternating current system AC.

Storage battery module M includes cell controller CC corresponding to a specified number of serially connected cells C. Cell controller CC measures states of a plurality of cells. A plurality of cell controllers CC are connected to battery controller BC. Battery controller BC acquires states of a plurality of cells from a plurality of cell controllers CC. Battery controller BC calculates a charging state (SOC: State of Charge) or a battery degradation state (SOH: State of Health) based on the acquired states of a plurality of cells and notifies a calculation result to host system controller SC.

Host system controller SC settles operation of cells from a viewpoint of energy saving, for example. A large, high-output facility may connect a plurality of storage battery modules M in parallel.

In FIG. 2, various types of information are exchanged between battery controller BC and cell controller CC and between cell controllers CC in storage battery module M. The communication therebetween may be wired. However, Patent Document 1 proposes changing wired communication to wireless communication between cell controller CC and battery controller BC and between cell controllers CC.

According to Patent Document 1, the wireless communication eliminates the need for insulation by a photocoupler used for the wired communication and can prevent insulation breakdown on battery controller BC or cell controller CC due to short-circuiting on an insulation element such as the photocoupler and prevent a short-circuit discharge on the secondary battery, improving the reliability. A communication antenna is provided at an opposing position of a module (corresponding to cell controller CC in FIG. 1) to be capable of preventing a communication failure due to interference of signals transmitted from the communication antennas.

Changing the wired communication to the wireless communication can reduce wiring costs, insulation costs for measures against high voltage, and installation costs. Further, it is considered to improve the degree of freedom concerning cell arrangement and storage battery module shapes.

Patent Document 1 uses the wireless communication for connection between the controllers (cell controller CC and battery controller BC) in a battery system. This system is hereinafter referred to as a wireless battery system.

CITATION LIST

Patent Document

Patent Document 1: Japanese Patent Application Laid-Open No. 2012-222913

SUMMARY OF THE INVENTION

Technical Problem

The configuration of the wireless battery system according to Patent Document 1 can eliminate the need for communication in storage battery module M and wiring for measurement and is therefore preferable as a battery system. However, the system needs to consider countermeasures against a communication failure. The system needs to stably continue operating even during a communication failure that allows the existence of a space region indicating a low signal communication level or causes unsuccessful communication due to an external noise, for example.

Figure 1:
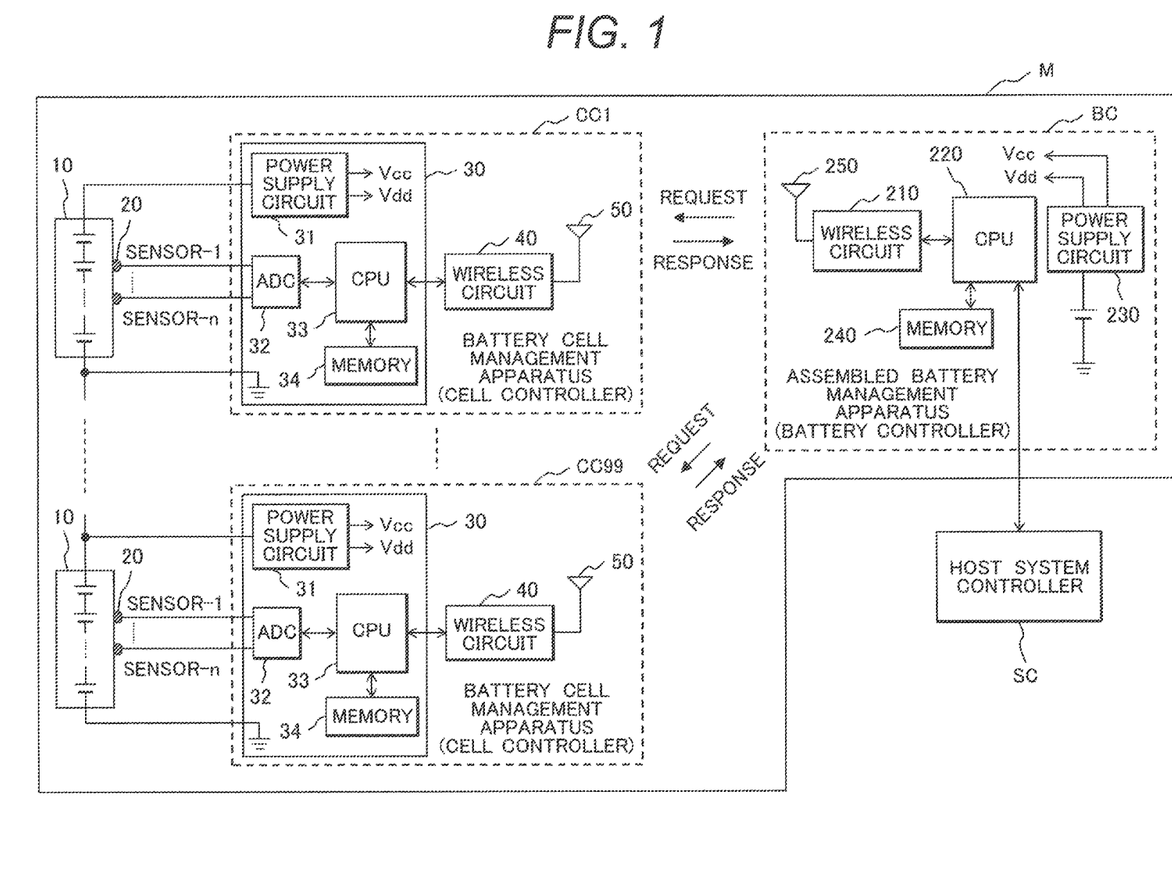
FIG. 1 is a drawing illustrating a basic configuration of a wireless battery system according to the present invention.

In terms of this point, Patent Document 1 describes that the wireless battery system can avoid unsuccessful communication due to interference of signals transmitted from communication antennas by placing the communication antennas at opposing positions for a module (corresponding to cell controller CC in FIG. 1). However, the system is unrelated to unsuccessful communication due to interference from an external wireless instrument or radio wave reflection or shielding under a surrounding physical environment.

The wireless battery system according to Patent Document 1 is fully deliberated as a preliminary countermeasure before installation of a facility but does not anticipate an issue of an actual communication failure that may occur under an unexpected environment or in relation to the outside. The system therefore stops or is inoperable when an unexpected failure occurs.

It is therefore an object of the present invention to provide a wireless battery system and a wireless system capable of coping with unsuccessful communication due to interference from an external wireless instrument or radio wave reflection or shielding under a surrounding physical environment.

These and other objects and novel features of the present invention may be readily ascertained by referring to the following description and appended drawings.

Solution to Problem

According to the present invention as above, a wireless battery system allocates a cell controller to a cell, detects a cell state, and wirelessly communicates a cell state detected by a cell controller to a battery controller. During the wireless communication, the battery controller transmits a beacon to the cell controller and specifies a period for radio wave environment measurement and a frequency to be measured as a condition. The cell controller performs radio wave environment measurement under the specified condition and then returns a measurement result along with the cell state to the battery controller.

Battery controller BC can therefore always recognize a radio wave state of a frequency other than a communication frequency even during communication in progress and can continue the communication by specifying an appropriate frequency even when unsuccessful communication occurs.

Advantageous Effects of the Invention

According to the present invention, the battery controller can therefore always recognize a radio wave state of a frequency other than a communication frequency even during communication in progress and can continue the communication by specifying an appropriate frequency even when unsuccessful communication occurs.

DESCRIPTION OF EMBODIMENTS

Embodiments of the present invention will be described in further detail with reference to the accompanying drawings. In short, the present invention always measures radio wave states depending on an external wireless instrument or the surrounding physical environment at frequencies different from a communication frequency in parallel with the communication so that an optimal frequency can be selected to continue the communication in the event of unsuccessful communication.

The same member is given the same reference sign in all drawings to illustrate the embodiments and a repetitive description is omitted.

<First embodiment>

FIG. 1 illustrates a basic configuration of the wireless battery system according to the present invention. The wireless battery system represents the configuration of a communication and measurement system corresponding to storage battery module M in FIG. 2. The wireless battery system uses one or a plurality of battery cell groups 10 as one unit and includes cell controller CC and battery controller BC installed for each battery cell group 10.

The example in FIG. 1 uses 99 cell controllers CC from CC1 to CC99. One battery controller BC manages these cell controllers CC as a whole. Therefore, cell controller CC provides the function of a battery cell management apparatus and battery controller BC provides the function of an assembled battery management apparatus.

Cell controller CC functioning as the battery cell management apparatus includes one or a plurality of measuring instruments 20 to measure states of the battery group 10, a processor 30 to acquire and process battery state information, a wireless circuit 40, and an antenna 50 to input and output radio waves.

The processor 30, as a major part of cell controller CC, includes a power supply circuit 31, a detection circuit (A/D converter) 32, a processing circuit (CPU) 33, and a storage unit (memory) 34. The power supply circuit 31 is supplied with power from a plurality of battery cell groups 10 to generate an operating voltage. The detection circuit 32 detects states of one or a plurality of battery cells from information measured by the measuring instrument 20. The processing circuit 33 diagnoses states of one or a plurality of battery cells based on detection information detected by the detection circuit 32. The storage unit 34 stores individual identification information and detection information and/or diagnosis information.

Battery controller BC, functioning as the assembled battery management apparatus, includes a wireless circuit 210, a processing circuit (CPU) 220, a power supply circuit 230 including a battery, a storage unit (memory) 240, and an antenna 250. The power supply circuit 230 is powered from a battery in FIG. 1 but may be powered from outside. Host system SC may be configured equally to battery controller BC but excludes the wireless circuit 210 and the antenna 250 when using wired connection to battery controller BC.

Battery controller BC periodically communicates with one or more cell controllers CC to acquire battery states detected by cell controller CC. Battery controller BC operates as a master and cell controller CC operates as a slave during wireless communication between cell controller CC and battery controller BC.

Figure 3:
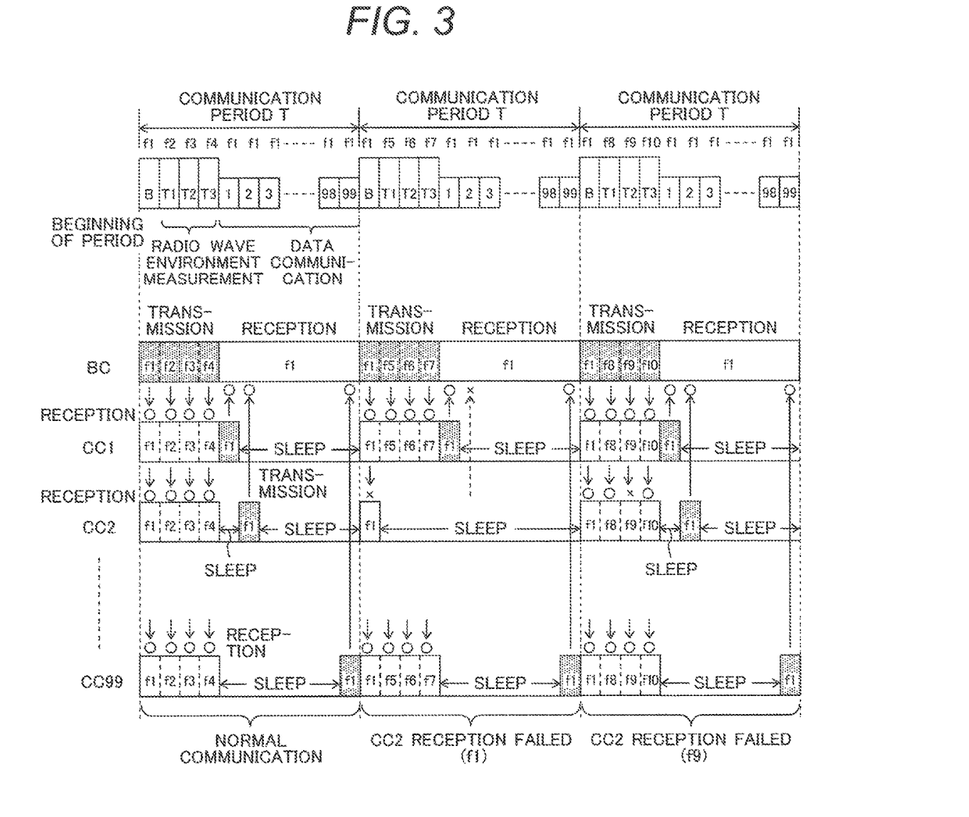
FIG. 3 is a drawing illustrating a time sharing communication slot configuration example according to a first embodiment between battery controller BC and a plurality of cell controllers CC.

FIG. 3 illustrates a time sharing communication slot configuration between battery controller BC and a plurality of cell controllers CC. The communication occurs at communication period T corresponding to a specified length of time and performs a sequence of processes in which battery controller BC issues a transmission request to a plurality of cell controllers CC within communication period T managed by battery controller BC and a plurality of cell controllers CC receive the transmission request and respond with signals maintained in cell controllers CC to battery controller BC.

FIG. 3 illustrates a slot configuration within communication period T to implement this. FIG. 3 assumes that there are 99 cell controllers CC from CC1 to CC99 and one battery controller BC manages the communication therebetween.

Communication slots in one communication period T include beacon slot B indicating the beginning of the period, radio wave environment measurement slots (T1, T2, and T3) following beacon slot B, and data communication slots (1 through 99). FIG. 3 illustrates three radio wave environment measurement slots T1 through T3. However, one or more slots may be included. Similarly, data communication slots 1 through 99 are illustrated. However, one or more slots may be included according to the number of cell controllers CC.

Operation of battery controller BC will be described. Battery controller BC performs broadcast transmission at beacon slot B indicating the beginning of the communication period by setting a frequency used for the communication to f1. Transmission data for beacon slot B includes data indicating the beacon, data for communication and measurement to be transmitted to cell controller CC from battery controller BC, and data for frequencies (T1=f2, T2=f3, and T3=f4 corresponding to the period at the left) used for the radio wave environment measurement slots following the beacon.

The data indicating the beacon includes a so-called synchronization signal and an ID indicating that battery controller BC is a transmitter. Cell controller CC as a reception side can thereby confirm synchronization with a transmission side or process time management in cell controller CC.

The data for communication and measurement to be transmitted to cell controller CC from battery controller BC includes specification of a type of data (battery states such as voltage, current, and temperature) supplied from cell controller CC or information about the priority of a frequency (hereinafter referred to as a base frequency) used for the data communication. Cell controller CC as the reception side is supplied with data to be transmitted from cell C and transmits the data. A frequency specified based on the priority is used as the base frequency for data communication. Information about the priority of the base frequency and the usage thereof will be described later.

Data for frequencies (T1=f2, T2=f3, and T3=f4 corresponding to the period at the left) used for the radio wave environment measurement slots following the beacon will be described below.

After transmitting beacon B, battery controller BC changes the frequency to f2 and broadcasts data indicating the radio wave environment measurement at radio wave environment measurement slot T1. Battery controller BC then changes the frequency to f3 and broadcasts data indicating the radio wave environment measurement at radio wave environment measurement slot T2. Battery controller BC then changes the frequency to f4 and broadcasts data indicating the radio wave environment measurement at radio wave environment measurement slot T3.

There has been described the process on battery controller BC as the transmission side. Cell controller CC thereafter enters a reception process. At this time, battery controller BC sets the frequency to f1 equal to beacon slot B and receives transmission from each cell controller CC.

In the present invention, the base frequency signifies frequency f1 to transmit beacon slot B and frequency f1 used for reception from cell controller CC. Frequencies (T1=f2, T2=f3, and T3=f4 corresponding to the period at the left) used for the radio wave environment measurement slots following the beacon are regarded as base frequency candidates. When a communication failure is found at base frequency f1, a new frequency is selected as the base frequency from the base frequency candidates and the new base frequency is used to continue the operation. The radio wave environment measurement slots (T1, T2, and T3) following beacon slot B monitor and measure communication states corresponding to the base frequency candidates.

The present invention periodically repeats this. The frequency of the radio wave environment measurement slot may be changed depending on frequencies. FIG. 3 changes base frequency candidates based on each of three consecutive communication periods T as a unit. In FIG. 3, base frequency candidates are assumed to be f2 through f4 corresponding to the period at the left, f5 through f7 corresponding to the period at the center, and f8 through f10 corresponding to the period at the right so as to measure the communication environment at this time.

Each cell controller CC receives the beacon transmitted by battery controller BC at frequency f1. Depending on the contents of the received beacon data, cell controller CC performs a synchronization process or an ID process, confirms the reception request, updates the priority information, and starts a process to acquire the requested transmission information. Cell controller CC recognizes the frequencies (T1=f2, T2=f3, and T3=f4 corresponding to the period at the left) of the radio wave environment measurement slots from the received data.

Each cell controller CC sets the frequency to f2, receives the transmission from battery controller BC at radio wave environment measurement slot T1, and saves a reception result (indicating whether the reception is successful or the reception signal intensity when the reception is successful). The frequency is then set to f3. The transmission from battery controller BC is received at radio wave environment measurement slot T2. A reception result (indicating whether the reception is successful or the reception signal intensity when the reception is successful) is saved. The frequency is then set to f4. The transmission from battery controller BC is received at radio wave environment measurement slot T3. A reception result (indicating whether the reception is successful or the reception signal intensity when the reception is successful) is saved.

The frequency is returned to f1. Data corresponding to the transmission request contents such as data (voltage, temperature, or current) acquired from measuring the battery state is transmitted along with the reception results for the T1 through T3 slots at the communication slot predetermined for each cell controller CC.

A detailed operation will be described with reference to the time sharing communication slot configuration example in FIG. 3 by using cell controller CC99 as an example. In this case, cell controller CC99 receives beacon slot B at frequency f1 and recognizes the beginning of the communication period and the frequencies (f2 through f4) of the radio wave environment measurement slot (T1 through T3) following beacon slot B.

The frequency is then changed at each radio wave environment measurement slot to receive transmission data for the radio wave environment measurement from battery controller BC. Frequency f1 as the base frequency is specified to sleep until the data communication slot 99. Cell controller CC needs to minimize the power consumption because the drive power supply is acquired from cell C. A deep sleep state is therefore used during the sleep duration to conserve the energy consumption. An internal timer is used for the sleep time. The sleep is released after a predetermined time elapses. Battery state data and a radio wave environment measurement reception result are transmitted at the data communication slot 99. Beacon slot B is received again after the data transmission. The sleep state also takes effect after the data transmission (see cell controller CC2). A wake-up state needs to be active immediately before the next beacon slot B is received. A process at this time is also performed based on the internal timer. The internal timer is preferably synchronized with battery controller BC as the transmission side in response to reception of beacon B. The present invention periodically repeats this operation. There has been described the operation of cell controller CC when the beacon is normally received. Unsuccessful reception of the beacon bypasses reception at the radio wave environment measurement slot or transmission at the communication slot.

The communication period at the left indicates a state to represent the absence of a failure such as disturbance in the relationship between battery controller BC and a plurality of cell controllers CC (CC1 through CC99) in FIG. 3. Suppose all cell controllers CC (CC1 through CC99) correctly receive the communication from battery controller BC using frequencies f1 through f4 and frequency f1 is thereafter used to correctly transmit a response signal and battery controller BC can receive this signal. This enables battery controller BC to correctly identify that no communication failure exists during this communication period.

The communication period at the center indicates a state to represent occurrence of a reception failure due to disturbance in cell controller CC2 in the relationship between battery controller BC and a plurality of cell controllers CC (CC1 through CC99) in FIG. 3. Cell controller CC2 that fails to detect frequency f1 for beacon B cannot recognize a transmission request from battery controller BC and cannot be notified of frequencies (f2 through f4) for the radio wave environment measurement slots (T1 through T3) following subsequent beacon slot B. Therefore, no response operation starts in the communication period at the center until frequency f1 for beacon B is detected next time.

Battery controller BC can correctly recognize that a reception failure occurs in cell controller CC2 due to disturbance when no response returns from cell controller CC2 during this communication period. This applies to a base frequency failure, namely, a failure of frequency f1 used to transmit beacon slot B and a response signal. The base frequency may need to be changed to a base frequency candidate when the failure is not transient. A process to change to a base frequency candidate will be described below.

The communication period at the right indicates a state to represent occurrence of a reception failure at frequency f9 in the relationship between battery controller BC and a plurality of cell controllers CC (CC1 through CC99) in FIG. 3. In this case, a plurality of cell controllers CC (CC1 through CC99) are ready for reception, expecting transmission using frequency f9 based on the data included in beacon B. However, only cell controller CC2 cannot receive the transmission. Nevertheless, cell controller CC2 is capable of a response process by using beacon B as a start point or at a slot position promised to itself.

At this time, a response signal includes the reception failure at frequency f9. Battery controller BC can therefore correctly recognize that a reception failure occurs in cell controller CC2 at frequency f9. In this case, the reception failure is detected at frequency f9 as a base frequency candidate. Battery controller BC performs a process to lower the priority of frequency f9 as a base frequency candidate. Management of the priority for a base frequency candidate will be described later.

Battery controller BC processes results of receiving radio wave environment measurements of frequencies periodically transmitted by each cell controller CC and generates a frequency list of frequencies in the order of favorable radio wave environments (characterized by a small number of reception errors and large reception signal intensity). Beacon slot B is used to notify each cell controller CC of a change in the frequency list, if any. Each cell controller CC receives the frequency list transmitted from battery controller BC and updates and maintains the frequency list. The frequency list represents the priority as the base frequency candidate. Beacon slot B is used to notify each cell controller CC of the priority.

Battery controller BC may not be able to receive transmissions from cell controllers CC at a specified ratio or within a specified number of successive times. In such a case, battery controller BC selects an appropriate frequency (a frequency corresponding to the most favorable radio wave environment or a frequency corresponding to a favorable radio wave environment next to the base frequency) from the frequency list and uses the beacon to notify each cell controller CC that the base frequency is changed. Thereafter, battery controller BC and each cell controller CC perform communication by changing the base frequency. Cell controller CC may not be able to receive a frequency change notification. In such a case, cell controller CC changes the base frequency to another (a frequency corresponding to the most favorable radio wave environment or a frequency corresponding to a favorable radio wave environment next to the base frequency) based on the frequency list after a lapse of specified time and performs successive reception to search for the beacon.

As above, it is possible to measure radio wave environments of the other frequencies and keep track of radio wave states while battery controller BC is communicating with a plurality of cell controllers CC. This enables the communication to continue by changing the frequency to an appropriate one based on radio wave states of the other frequencies when the frequency used for the communication causes an error.

<Second Embodiment>

The first embodiment has described the example in which battery controller BC uses the radio wave environment measurement slots (T1 through T3) for transmission and cell controllers CC transmit results of receiving the transmission from battery controller BC along with the battery state data by using the data communication slot. According to the second embodiment, battery controller BC and each cell controller CC both use the radio wave environment measurement slots (T1 through T3) to perform reception and measure the reception signal intensity. Cell controllers CC transmit results of measuring the reception signal intensity along with the battery state data. The second embodiment will be described in detail with reference to FIG. 4. There is no conditional difference between FIGS. 3 and 4 except that the radio wave environment measurement slots (T1 through T3) correspond to a duration to audiovisually check radio waves.

Figure 4:
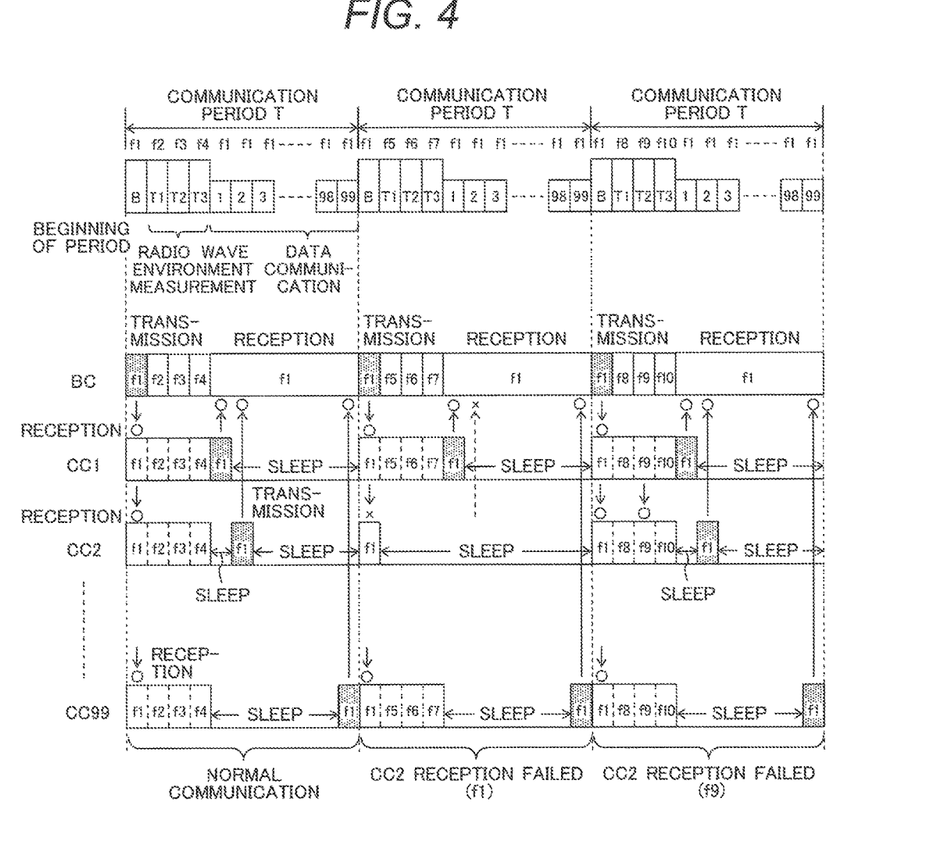
FIG. 4 is a drawing illustrating a time sharing communication slot configuration example according to a second embodiment between battery controller BC and a plurality of cell controllers CC.

In FIG. 4, battery controller BC broadcasts data at beacon slot B indicating the beginning of the communication period by specifying frequency f1. The transmission data includes data indicating the beacon, data for communication and measurement transmitted from battery controller BC to cell controller CC, and data for the frequencies (T1=f2, T2=f3, and T3=f4 corresponding to the period at the left) used for the radio wave environment measurement slots following the beacon.

After transmitting the beacon, battery controller BC changes the frequency to f2, performs a reception operation at radio wave environment measurement slot T1, and measures the reception signal intensity. The frequency is then changed to f3 to perform a reception operation at radio wave environment measurement slot T2 and measure the reception signal intensity. The frequency is then changed to f4 to perform a reception operation at radio wave environment measurement slot T3 and measure the reception signal intensity.

Battery controller BC then specifies frequency f1 equal to beacon slot B and receives the transmission from each cell controller CC. This is repeated periodically. The frequency of the radio wave environment measurement slot may be changed depending on frequencies.

Each cell controller CC receives the beacon using frequency f1 and recognizes the frequencies (T1=f2, T2=f3, and T3=f4 corresponding to frequency 1) of the radio wave environment measurement slots from the received data. The frequency is then specified as f2 to perform a reception operation at radio wave environment measurement slot T1 and measure the reception signal intensity. The frequency is then specified as f3 to perform a reception operation at radio wave environment measurement slot T2 and measure the reception signal intensity. The frequency is then specified as f4 to perform a reception operation at radio wave environment measurement slot T3 and measure the reception signal intensity.

The frequency is then returned to f1. A predetermined communication slot is used to transmit data of measuring the battery state along with a result of measuring the reception signal intensities for the T1 through T3 slots.

The communication period at the left indicates a state to represent the absence of disturbance in the relationship between battery controller BC and a plurality of cell controllers CC (CC1 through CC99) in FIG. 4. The radio wave environment measurement slots (T1 through T3) represent the state in which battery controller BC and each cell controller CC perform reception operation to measure the reception signal intensity but do not receive a frequency signal whose reception intensity causes a failure to the specified frequencies (T1=f2, T2=f3, and T3=f4 corresponding to frequency 1).

The communication period at the center indicates a state to represent occurrence of a reception failure due to disturbance in cell controller CC2 in the relationship between battery controller BC and a plurality of cell controllers CC (CC1 through CC99) in FIG. 4. Cell controller CC2 that fails to detect frequency f1 for beacon B cannot recognize a transmission request from battery controller BC and cannot be notified of the frequencies (f2 through f4) for the radio wave environment measurement slots (T1 through T3) following subsequent beacon slot B. Therefore, no response operation starts in the communication period at the center until frequency f1 for beacon B is detected next time.

Battery controller BC can correctly recognize that a reception failure occurs in cell controller CC2 due to disturbance caused to beacon B when no response returns from cell controller CC2 during this communication period. It is also possible to recognize that the frequency of the disturbance is f1. In this case, battery controller BC needs to change the frequency to a base frequency candidate.

The communication period at the right indicates a state to represent occurrence of a reception operation at frequency f9 for cell controller CC2 in the relationship between battery controller BC and a plurality of cell controllers CC (CC1 through CC99) in FIG. 4. In FIG. 4, the radio wave environment measurement slots (T1 through T3) correspond to an audiovisual duration. The state indicates the frequency f9 is measured while frequency f9 intrinsically cannot be measured audiovisually.

In this case, a plurality of cell controllers CC (CC1 through CC99) enter a situation to monitor and measure frequency f9 from the data included in beacon B. Only cell controller CC2 receives frequency f9 that is not detected intrinsically. Cell controller CC2 is capable of a response process using beacon B as a start point and can notify the reception (reception failure) of frequency f9 to battery controller BC during the response process at a slot position promised to itself. Battery controller BC reflects this result on the change of the priority.

In the first embodiment and the second embodiment described above, the first embodiment positively generates the frequency of a base frequency candidate from battery controller BC and monitors the reception at the radio wave environment measurement slot. The second embodiment monitors only the reception of the frequency of a base frequency candidate without generating the frequency.

According to this technique, the first embodiment detects occurrence of a communication failure causing an intrinsically audible event to be inaudible (e.g., null point) and the second embodiment detects occurrence of a communication failure causing an intrinsically inaudible event to be audible (e.g., noise). Obviously, the present invention can be embodied by including one of these functions but can be more preferably embodied by including both functions.

There has been described the example in which battery controller BC determines a communication failure. However, a host system controller can perform this function.

<Third Embodiment>

The first embodiment and the second embodiment have described that battery controller BC mainly measures the environment by providing the radio wave environment measurement slots (T1 through T3). The third embodiment describes a technique of reflecting evaluation of the measured environment on the priority as a base frequency candidate with reference to FIGS. 5 and 6.

Figure 5:
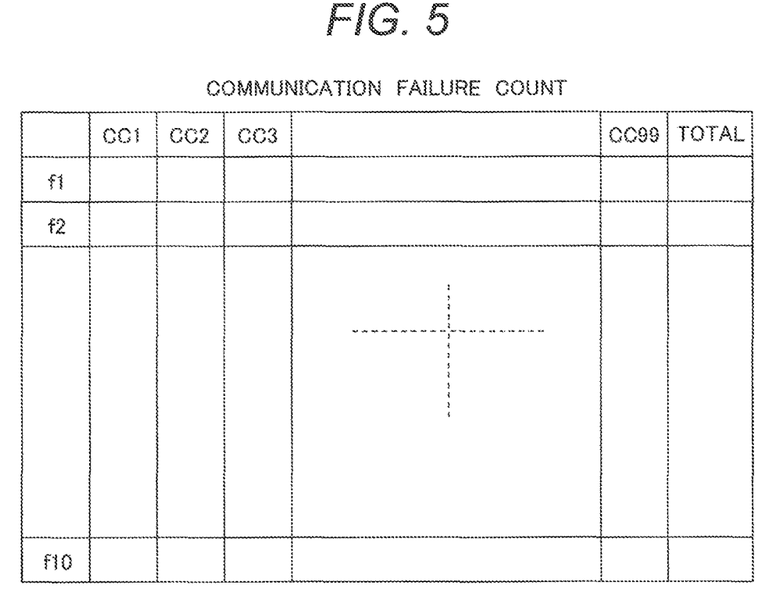
FIG. 5 is a drawing illustrating a table that stores a communication failure count as one of environment evaluation indexes corresponding to each base frequency candidate.

FIG. 5 illustrates a table that stores the number of communication failures, as one of environment evaluation indexes, corresponding to each base frequency candidate. This table is provided in battery controller BC that specifies the priority. The stored contents are updated each time a communication failure occurs.

The table in FIG. 5 provides matrices including a plurality of cell controllers CC (CC1 through CC99) along the horizontal axis and base frequency candidates (f2 through f10) along the vertical axis. Each matrix sequentially records the number of communication failures under the condition and is updated each time a failure occurs. The right side of the table records the total number of communication failures corresponding to the base frequency candidates (f2 through f10). FIG. 5 also illustrates an example of measuring and evaluating the base frequency.

Figure 6:
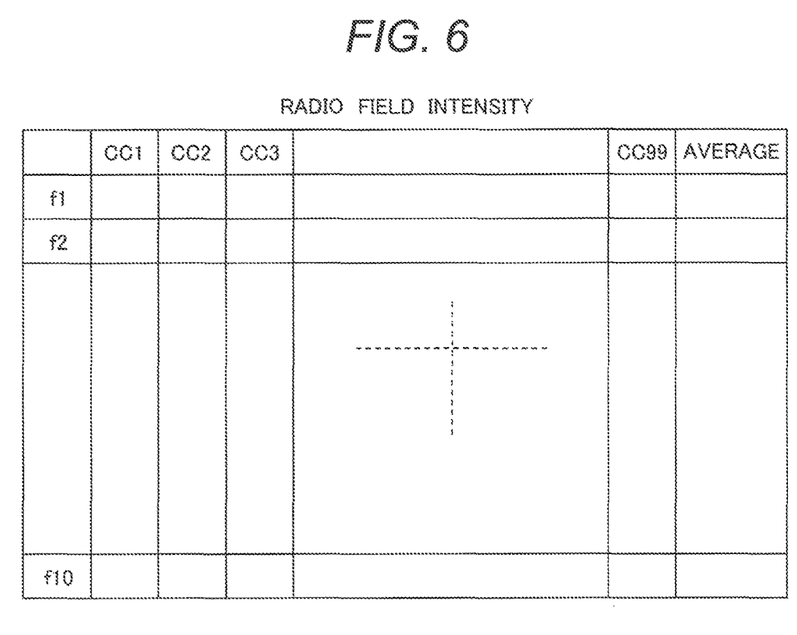
FIG. 6 is a drawing illustrating a table that stores radio field intensity as one of environment evaluation indexes corresponding to each base frequency candidate.

FIG. 6 illustrates a table that records the measured radio field intensity, as one of environment evaluation indexes, corresponding to each base frequency candidate. This table is provided in battery controller BC that specifies the priority in order to update the radio field intensity.

The table in FIG. 6 provides matrices including a plurality of cell controllers CC (CC1 through CC99) along the horizontal axis and base frequency candidates (f2 through f10) along the vertical axis. Each matrix records the radio field intensity under the condition. The right side of the table records average radio field intensity for the base frequency candidates (f2 through f10), for example. The radio field intensity is divided into 100 grades from 0 to 99, for example. A smaller numeric value corresponds to higher radio field intensity. FIG. 6 also illustrates an example of measuring and evaluating the base frequency.

An index to specify the priority is specified by using two indexes, namely, the number of communication failures and the radio field intensity by calculating "the number of communication failures×100×the number of cell controllers to detect a failure−radio field intensity (dBm)" for each base frequency candidate (f2 through f10) so that the priority increases in ascending order of the evaluated numeric values, for example.

The index to specify the priority based on this principle performs evaluation that focuses on the number of communication failures rather than the radio field intensity. The evaluation results from focusing on a situation of causing a communication failure rather than a state of slightly low radio field intensity.

The third embodiment is based on the result of the environment measurement performed in the first embodiment and the second embodiment and allows battery controller BC to process a result of measuring the reception signal intensity at the frequency as each base frequency candidate periodically transmitted by each cell controller CC and a result of measuring the reception signal intensity on battery controller BC. The number of communication failures is managed. According to this result, the frequency list of frequencies is generated so as to place the frequencies in the order of favorable radio wave environments (characterized by small reception signal intensity and a small number of communication failures). Beacon B is used to notify each cell controller CC of a change in the frequency list, if any. Each cell controller CC receives the frequency list transmitted from battery controller BC and updates and maintains the frequency list.

<Fourth Embodiment>

Figure 7:
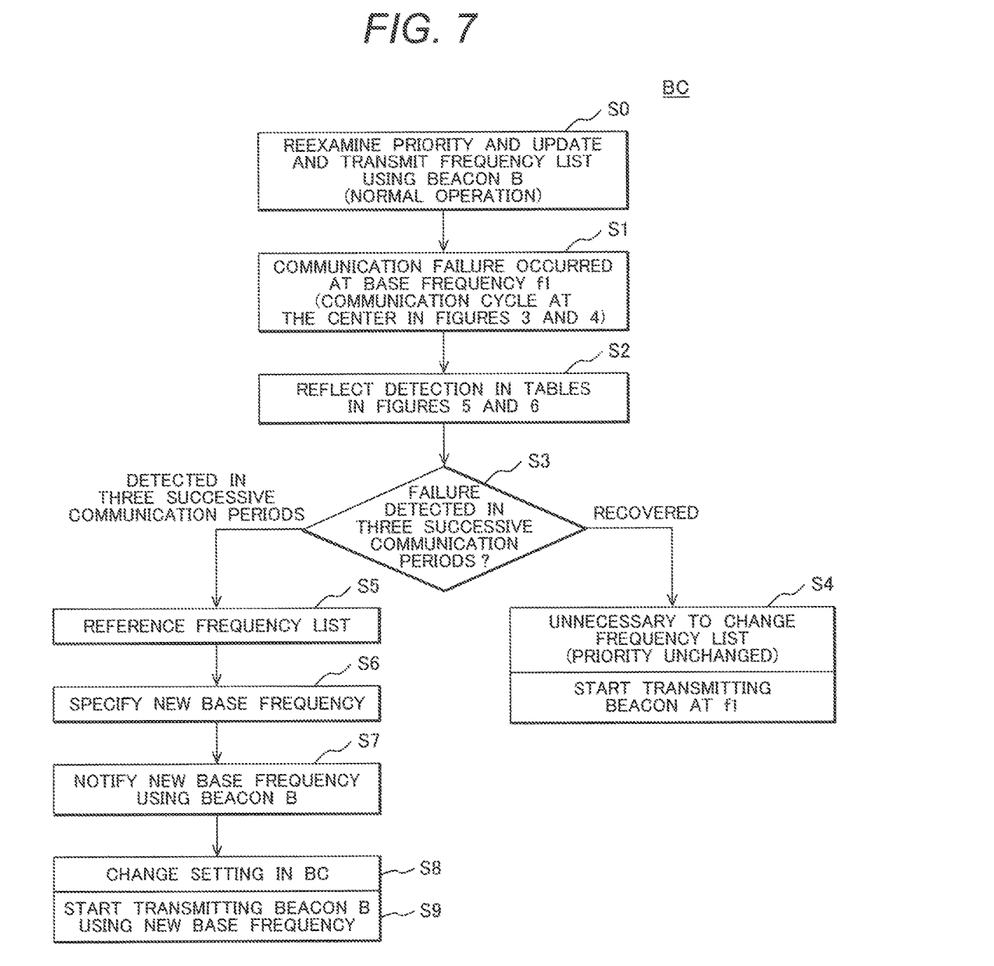
FIG. 7 is a flowchart illustrating a processing procedure in battery controller BC when a communication failure occurs at a basic frequency.
Figure 8:
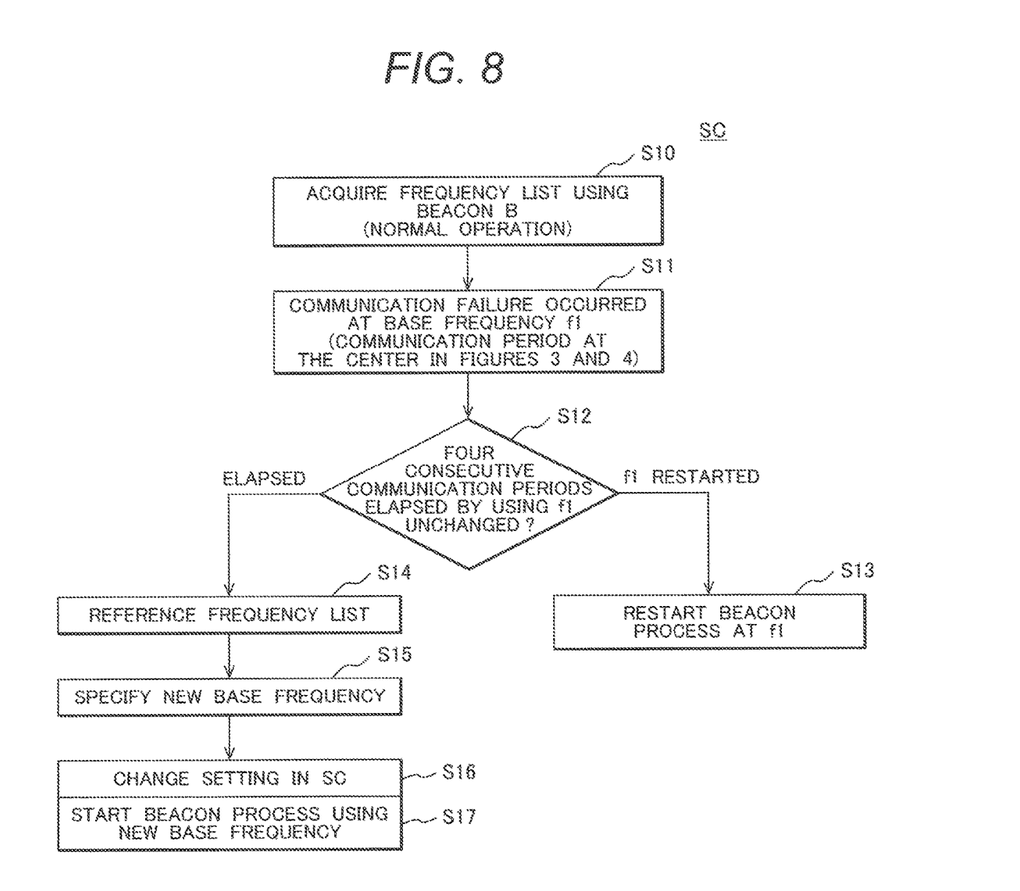
FIG. 8 is a flowchart illustrating a processing procedure in cell controller CC when a communication failure occurs at a basic frequency.

The third embodiment has described the technique that evaluates the measured environment and reflects the evaluation on the priority as a base frequency candidate. The fourth embodiment describes processing procedures in battery controller BC and cell controller CC when a communication failure occurs at the base frequency. FIG. 7 is a flowchart illustrating a processing procedure in battery controller BC when a communication failure occurs at the base frequency. FIG. 8 is a flowchart illustrating a processing procedure in cell controller CC when a communication failure occurs at the base frequency.

At step S0 as a normal process, battery controller BC in FIG. 7 uses the environment measurement results in FIGS. 5 and 6 to always maintain the updated frequency list (priority reexamination). When the frequency list is changed, the communication using beacon B is performed to notify cell controller CC of the contents of the updated frequency list.

At step S1, a communication failure is detected at base frequency f1 (see the communication period at the center in FIGS. 3 and 4). At step S2, the tables in FIGS. 5 and 6 reflect this detection.

At step S3 in FIG. 7, the base frequency is changed when the failure is detected three times in succession. The base frequency can be changed after a failure is measured once. However, it is favorable to confirm a failure several times by considering that the base frequency is evaluated and specified as being most reliable in an advance environment measurement.

When the recovery succeeds before the third detection, the frequency list change (priority change) is not performed at step S4 and the current base frequency f1 is used to restart the beacon transmission.

When the failure is detected successively, the frequency list is referenced at step S5 to change the base frequency and a new base frequency is selected from most highly evaluated base frequency candidates (step S6). At step S7, beacon B is used to notify each cell controller to change the base frequency to the new base frequency. At step S8, the setting in battery controller BC is changed. At step S9, the new base frequency is used to start transmitting beacon B.

Cell controller CC in FIG. 8 uses beacon B to acquire the contents of the updated frequency list as a normal process at step S10. At step S11 in this state, the communication failure at base frequency f1 is detected (see the communication period at the center in FIGS. 3 and 4).

In this case, cell controller CC performs monitoring at step S12 while maintaining reception frequency f1 until expiration of four successive communication periods to receive next beacon B. If the communication failure is detected once or twice successively, the process on battery controller BC in FIG. 7 (step S4) should restart the beacon transmission by using the current base frequency f1. The normal operation can be accordingly performed at step S13.

If the communication failure is detected three times successively, the process on battery controller BC in FIG. 7 (steps S5 through S9) should restart the beacon transmission by using the new base frequency. However, battery controller BC requires three successive communication periods for this determination and moreover uses one period to notify the other cell controllers CC to change to the new base frequency. The new base frequency is therefore used to restart the beacon transmission at the fifth period. Cell controller CC therefore confirms expiration of four periods at step S12, references the frequency list in cell controller CC at step S14, and selects a new base frequency from most highly evaluated base frequency candidates (step S15). At step S16, the setting in cell controller CC is changed. At step S17, the new base frequency is used to start the process by using beacon B.

According to the present invention as above, battery controller BC may not be able to receive transmissions from cell controllers CC at a specified ratio or within a specified number of successive times. In such a case, battery controller BC selects an appropriate frequency (a frequency corresponding to the most favorable radio wave environment or a frequency corresponding to a favorable radio wave environment next to the base frequency) from the frequency list and uses the beacon to notify each cell controller CC that the base frequency is changed. Battery controller BC and each cell controller CC perform communication by changing the base frequency. Cell controller CC may not be able to receive a frequency change notification. In such a case, cell controller CC changes the base frequency to another (a frequency corresponding to the most favorable radio wave environment or a frequency corresponding to a favorable radio wave environment next to the base frequency) based on the frequency list after a lapse of specified time and performs successive reception to search for the beacon.

The radio wave environment of other frequencies is measured to identify the radio wave state during communication between battery controller BC and a plurality of cell controllers CC. When an error occurs at the frequency for the communication in progress, the communication can continue by changing the current frequency to an appropriate frequency based on the radio wave state of the other frequencies.

<Fifth Embodiment>

The above-mentioned embodiments have been described on the assumption that a sufficient quantity of base data (FIGS. 5 and 6) is ensured in order to specify the priority in the frequency list. Namely, the above-mentioned description is based on the communication state that ensures the fully proven communication between battery controller BC and cell controller CC. However, sufficient data may not be ensured at an initial state. The fifth embodiment describes a time series operation with reference to FIG. 9 until battery controller BC and cell controller CC reach a sufficient communication state.

Figure 9:
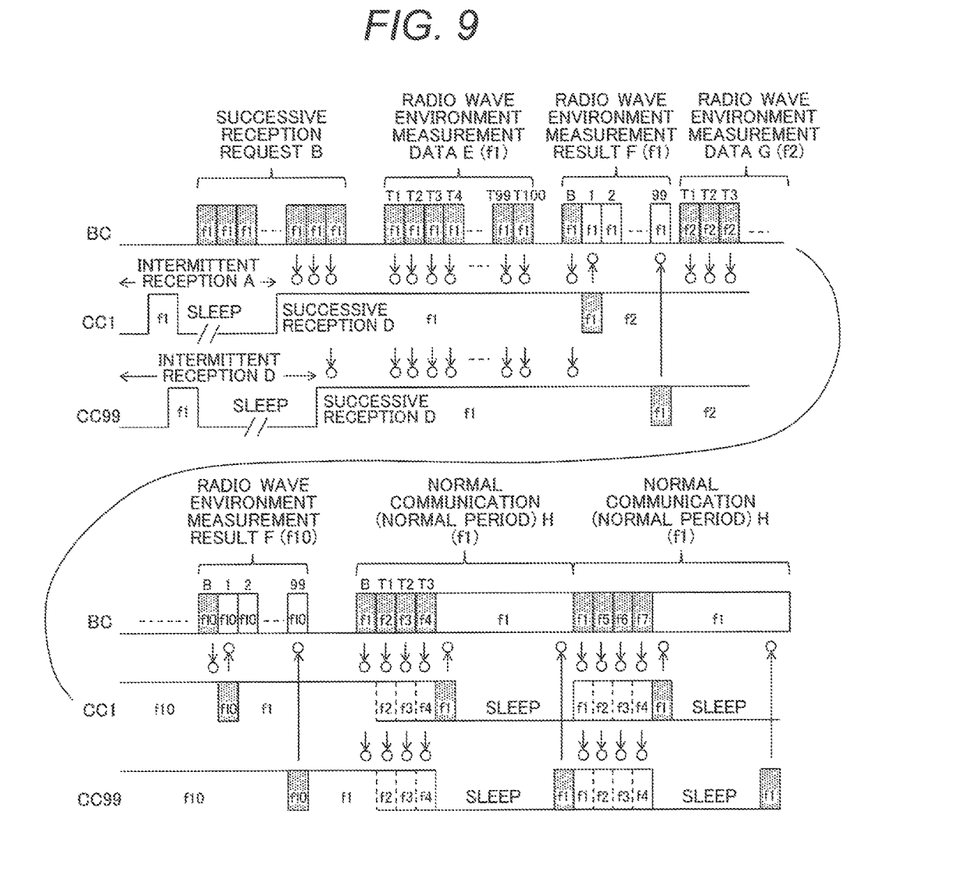
FIG. 9 is a drawing illustrating time series operation until battery controller BC and cell controller CC are fully ready for communication.

At an initial state immediately after installing the facility, cell controller CC repeats reception and the sleep state (low power consumption state) by using specified base frequency f1 (so-called intermittent reception) when the power is turned on or cell controller CC cannot communicate with battery controller BC. Reference symbol A in FIG. 9 represents a duration of intermittent reception Battery controller BC transmits successive reception request B to cell controller CC by using specified base frequency f1 when the power is turned on or battery controller BC cannot communicate with cell controller CC. This transmission B may be successive or intermittent. Successive reception request B from battery controller BC can be received in cell controller CC but is not detected in the sleep state of cell controller CC, and is received in the intermittent reception of cell controller CC. Cell controller CC that receives successive reception request B transitions to mode D that enables the successive reception at frequency f1.

Battery controller BC transmits successive reception request B and then transmits at least one packet of data (E) for the radio wave environment measurement at base frequency f1 while frequency f1 is unchanged.

Cell controller CC receives the radio wave environment measurement data at base frequency f1 and saves a reception result (the number of received packets and the reception signal intensity at the time of the reception).

Battery controller BC transmits data for the radio wave environment measurement performed on the base frequency candidates (f2 through F10) and then transmits a beacon indicating the beginning of the communication period in order to acquire a result of the radio wave environment measurement performed on the base frequency candidates (f2 through F10) from each cell controller CC. Data of this beacon includes base frequency f1 (F) on which the radio wave environment measurement is performed first. Subsequently, base frequency f1 activates the reception state.

When receiving the beacon, cell controller CC transmits a result of receiving the radio wave environment measurement at the time of base frequency f1 by using a specified communication slot subsequent to beacon B and then changes the frequency to f2 to enter the reception state.

Battery controller BC uses frequency f1 to receive the result of receiving the radio wave environment measurement at the time of base frequency f1 from each cell controller CC and then changes the frequency to f2 to transmit at least one packet of data for the radio wave environment measurement (G).

Cell controller CC receives the radio wave environment measurement data and saves a reception result (the number of received packets and the reception signal intensity at the time of the reception).

Battery controller BC transmits data for the radio wave environment measurement (G) and then transmits a beacon indicating the beginning of the communication period. Data of this beacon includes base frequency f3 on which the radio wave environment measurement is performed next. Subsequently, base frequency f2 activates the reception state.

When receiving the beacon, cell controller CC transmits a result of receiving the radio wave environment measurement by using a specified communication slot subsequent to the beacon and then changes the frequency to f3 to enter the reception state.

As above, battery controller BC and cell controller CC measure the radio wave environment while changing the frequency. The example in FIG. 9 measures the radio wave environment corresponding to frequencies f1 through f10. The battery controller transmits data for the radio wave environment measurement at frequency f10 and then transmits a beacon indicating the beginning of the communication period (H). Data of this beacon includes next frequency f1.

Battery controller BC receives the result of receiving the radio wave environment measurement from each cell controller CC at frequency f10 and then calculates a reception result (the number of received packets and the reception signal intensity at the time of the reception) from each cell controller CC at the corresponding frequency to generate the frequency list of frequencies that are placed in the order of favorable radio wave environments (characterized by a small number of communication failures and large reception signal intensity).

A beacon for the normal communication is then transmitted at frequency f1 to start communication with each cell controller. Data of the beacon includes the generated frequency list.

Cell controller CC transmits the radio wave environment measurement result at frequency f10 and then changes the frequency to f1 to enter the reception state. Cell controller CC receives the beacon for the normal communication from battery controller BC and then enters the normal time sharing communication state and saves the frequency list included in the beacon data.

REFERENCE SIGNS LIST

10 . . . one or a plurality of battery cell groups,
20 . . . one or a plurality of measuring instruments (sensors) to measure battery states,
30 . . . processor to acquire and process battery state information,
31 . . . power supply circuit 1,
32 . . . detection circuit (A/D converter) to detect battery cell states,
33 . . . processing circuit (CPU),
34 . . . storage unit (memory),
40 . . . wireless circuit,
50 . . . antenna,
CC . . . cell controller,
BC . . . battery controller,
210 . . . wireless circuit,
220 . . . processing circuit (CPU),
230 . . . power supply circuit including a battery,
240 . . . storage unit (memory),
250 . . . antenna

The invention claimed is:

1. A wireless battery system that allocates a cell controller to a cell, detects a cell state, and wirelessly communicates the cell state detected by the cell controller to a battery controller,
wherein:
during the wireless communication, the battery controller transmits a beacon to the cell controller and specifies a duration for radio wave environment measurement and a frequency to be measured as a condition and the cell controller performs radio wave environment measurement under the specified condition and then returns a measurement result along with the cell state to the battery controller.

2. The wireless battery system according to claim 1, wherein:

a frequency to transmit the beacon and a frequency used for response to the battery controller is each assumed to be a base frequency, a frequency for radio wave environment measurement corresponds to a frequency as a base frequency candidate, and a new frequency selected from a frequency as a base frequency candidate is used as a base frequency to continue subsequent communication when a failure occurs on communication using a base frequency.

3. The wireless battery system according to claim 2, wherein:

the battery controller transmits a signal at a frequency specified during the specified duration for radio wave environment measurement under the condition and the cell controller measures reception possibility and reception intensity of a signal at a frequency specified during the specified duration and responds to the battery controller.

4. The wireless battery system according to claim 2, wherein:

the battery controller and the cell controller measure reception possibility and reception intensity of a signal at a frequency specified during the specified duration and respond to the battery controller for radio wave environment measurement under the condition.

5. The wireless battery system according to claim 3, wherein:

the battery controller generates a frequency list specifying priorities in descending order of communication reliability corresponding to the specified frequency by using data representing reception possibility and reception intensity of a signal at the specified frequency and transmits the frequency list to the cell controller by using the beacon.

6. The wireless battery system according to claim 5, wherein:

the wireless communication performs a sequence of processes from transmission from the battery controller to response from the cell controller within a specified period and continues a process at a specified period; and when unsuccessful communication successively occurs n times at the base frequency during the specified period, the battery controller restarts transmission of the beacon by selecting a highly prioritized frequency in the frequency list as a new base frequency.

7. The wireless battery system according to claim 6, wherein:

when a failure to receive the beacon successively occurs at least n times during the specified period, the cell controller restarts reception of the beacon by selecting a highly prioritized frequency in the previously transmitted frequency list as a new base frequency.

8. The wireless battery system according to claim 1, wherein:

the wireless communication performs a sequence of processes from transmission from the battery controller to response from the cell controller within a specified period and continues a process at a specified period; and the specified period includes a slot indicating the beginning of a period for data communication, at least one slot for data communication, and at least one slot to measure radio wave environment, and a beginning slot for a data communication period and a slot for data communication are configured as the same frequency and a slot for radio wave environment measurement is configured as one of a frequency equal to a frequency for data communication and a frequency different from a frequency for data communication.

9. The wireless battery system according to claim 8, wherein:

the slot indicating the beginning of a period for data communication specifies a period for the radio wave environment measurement and a frequency to be measured as a condition, at least one slot to measure the radio wave environment performs radio wave environment measurement under the specified condition, and at least one slot for the data communication returns a measurement result and the cell state to the battery controller.

10. The wireless battery system according to claim 1, wherein:

a battery controller and a cell controller measure radio wave environment for each frequency in a communication frequency band at the time to initially start a wireless battery system, generate a list of frequencies in order of one of favorable radio wave environments and unfavorable radio wave environments, and specify a frequency for communication based on the list.

11. The wireless battery system according to claim 4, wherein:

the battery controller generates a frequency list specifying priorities in descending order of communication reliability corresponding to the specified frequency by using data representing reception possibility and reception intensity of a signal at the specified frequency and transmits the frequency list to the cell controller by using the beacon.

12. The wireless battery system according to claim 11, wherein:

the wireless communication performs a sequence of processes from transmission from the battery controller to response from the cell controller within a specified period and continues a process at a specified period; and when unsuccessful communication successively occurs n times at the base frequency during the specified period, the battery controller restarts transmission of the beacon by selecting a highly prioritized frequency in the frequency list as a new base frequency.

13. The wireless battery system according to claim 12, wherein:

when a failure to receive the beacon successively occurs at least n times during the specified period, the cell controller restarts reception of the beacon by selecting a highly prioritized frequency in the previously transmitted frequency list as a new base frequency.

\* \* \* \* \*